United States Patent
Uhl et al.

(10) Patent No.: US 11,161,463 B2
(45) Date of Patent: Nov. 2, 2021

(54) MOTOR-VEHICLE UNDERBODY LINER TO ABSORB ROLLING NOISE ON THE VEHICLE LINED THEREWITH

(71) Applicant: Röchling Automotive SE & Co. KG, Mannheim (DE)

(72) Inventors: Frank Uhl, Ober-Flörsheim (DE); Jürgen Küper, Worms (DE); Carsten Riewe, Nordhausen (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 16/829,767

(22) Filed: Mar. 25, 2020

(65) Prior Publication Data

US 2020/0307470 A1  Oct. 1, 2020

(30) Foreign Application Priority Data

Mar. 29, 2019  (DE) .................... 10 2019 108 169.6

(51) Int. Cl.
    *B60R 13/08*  (2006.01)
(52) U.S. Cl.
    CPC .................. *B60R 13/0861* (2013.01)
(58) Field of Classification Search
    CPC .................................. B60R 13/0861
    USPC ....................................... 296/39.3
    See application file for complete search history.

(56) References Cited

U.S. PATENT DOCUMENTS

| | | | | |
|---|---|---|---|---|
| 6,569,509 | B1 * | 5/2003 | Alts | B32B 3/20 |
| | | | | 181/284 |
| 10,960,652 | B2 * | 3/2021 | Miyano | B32B 27/12 |
| 2006/0103171 | A1 * | 5/2006 | Blomeling | B60R 13/0861 |
| | | | | 296/204 |

(Continued)

FOREIGN PATENT DOCUMENTS

| | | | | |
|---|---|---|---|---|
| DE | 19652527 A1 * | 6/1998 | | G10K 11/172 |
| DE | 102014218379 A1 * | 3/2016 | | B32B 5/02 |

(Continued)

OTHER PUBLICATIONS

Machine translation of JPH 249 (Year: 1997).*
Pfaffelhuber, Quiet Road Traffic 3, Joint Final Report, Oct. 2017, pp. 1-5, 218-279, publisher Federal Highway Institute, 68pgs.
German Third Party Submission for corresponding DE 10 2019 108 169.6 mailed Feb. 26, 2021, 18 pgs.

(Continued)

*Primary Examiner* — Hilary L Gutman
(74) *Attorney, Agent, or Firm* — Rankin, Hill & Clark LLP

(57) ABSTRACT

A motor-vehicle underbody liner, encompassing a planar porous open-cell carrier component; the carrier component being embodied for mounting onto a motor-vehicle underbody and for being carried along therewith; the carrier component including an installation side that faces toward the motor-vehicle underbody during operation as intended, and a liner side that faces away from the motor-vehicle underbody during operation as intended; the carrier component being adjusted, by suitable densification of its open-cell material, to a sound absorption behavior having a sound absorption maximum in a frequency range from 800 Hz to 1250 Hz; there being arranged on the installation side of the carrier component an additional absorber component having a sound absorption behavior whose sound absorption maximum is also located in a frequency range from 800 Hz to 1250 Hz.

17 Claims, 1 Drawing Sheet

(56) References Cited

U.S. PATENT DOCUMENTS

| | | | | |
|---|---|---|---|---|
| 2006/0169531 A1* | 8/2006 | Volker | .................. | G10K 11/172 |
| | | | | 181/204 |
| 2007/0151800 A1* | 7/2007 | Olson | ................... | E04B 1/8409 |
| | | | | 181/286 |
| 2008/0067002 A1* | 3/2008 | Pfaffelhuber | ......... | B60R 13/083 |
| | | | | 181/290 |

FOREIGN PATENT DOCUMENTS

| | | | | | |
|---|---|---|---|---|---|
| JP | 54001394 | A | * | 1/1979 | |
| JP | 09254249 | A | * | 9/1997 | |
| JP | 6821177 | B2 | * | 1/2021 | .............. F02B 77/11 |

OTHER PUBLICATIONS

Sekisui Alveo AG, Flat Absorber Made of Micro-Perforated Polyolefin-Foam, Jun. 2013, Plastics, publisher Plastics, 2 pages.†

Pfaffelhuber, Quiet Road Traffic 3, Joint Final Report, Oct. 2017, pp. 1-5, 218-220, 253, and 244, publisher Federal Highway Institute, 10 pgs.†

Lafont, Passive Treatment Solutions for the Reduction of Vehicle Exterior Tire Noise, SAE Technical Paper 2018-01-1571, Jun. 13, 2018, doi 10.4271/2018-01-1571, publisher SAE International, 9 pgs.†

Moos, Egon, Rochling Automotive, The Sucess of Nonwoven Materials for Lightweight and Acoustic Efficient Components in Underbody Applications, Index17 Exhibition, Apr. 4, 2017, publisher Index17, 9 pages.†

* cited by examiner
† cited by third party

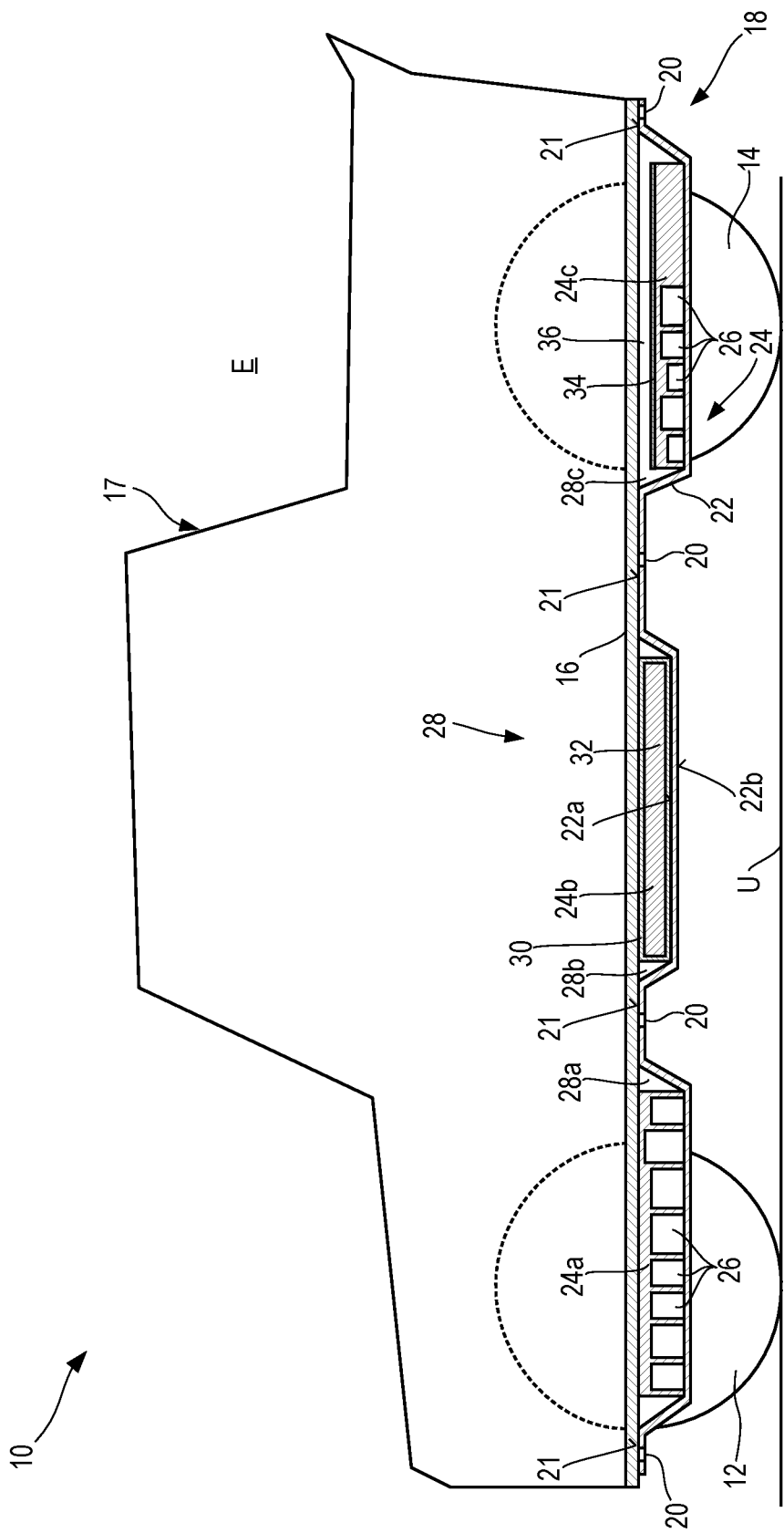

MOTOR-VEHICLE UNDERBODY LINER TO ABSORB ROLLING NOISE ON THE VEHICLE LINED THEREWITH

This application claims priority in German Patent Application DE 10 2019 108 169.6 filed on Mar. 29, 2019, which is incorporated by reference herein.

The present Application relates to a sound-absorbing motor-vehicle underbody liner and to a motor vehicle having such a motor-vehicle underbody liner.

BACKGROUND OF THE INVENTION

Requirements in terms of road traffic noise emission abatement are becoming increasingly stringent.

In the past, good sound absorption properties on vehicles could be achieved using porous open-cell inherently rigid liner components, made in particular of LWRT. The sound absorption results achieved with these planar liner components can be improved only by increasing the amount of material used for the liner component. This results in an increase in the weight of the vehicle, and in not inconsiderable increases in cost.

It is furthermore known to constitute liners for underbodies of motor vehicles from compact non-sound-absorbing plastics having absorber structures, for example absorber chambers. By corresponding dimensioning, for example by selecting the chamber volume of one or several absorber chambers, the absorber structures, in particular the aforesaid absorber chambers, can be adjusted to specific frequencies that are absorbed to a particularly high degree.

One problem with regard to the aforementioned more-stringent requirements in terms of noise emission abatement is decreasing the emission of rolling noise from a vehicle, which is produced at the tire contact surfaces. The potential for decreasing rolling noise at a predetermined driving speed by configuration of the tire profile appears to be exhausted.

SUMMARY OF THE INVENTION

An object of the present Application is to describe a motor-vehicle underbody liner that is particularly suitable for reducing rolling noise of the vehicle tires, on the vehicle that carries the motor-vehicle underbody liner, in a relevant speed range of between 40 and 60 km/h.

This relates both to decreasing rolling noise emitted outward to the vehicle's surroundings and to reducing rolling noise that travels into the vehicle interior, but particularly the former.

This object is achieved according to the present invention by a motor-vehicle underbody liner that encompasses a planar porous open-cell carrier component, the carrier component being embodied for mounting onto a motor-vehicle underbody and for being carried along therewith. The carrier component comprises an installation side that faces toward the motor-vehicle underbody during operation as intended, and a liner side that faces away from the motor-vehicle underbody during operation as intended. In addition, a sound-absorption-capable additional absorber component is arranged on the installation side of the carrier component in order to increase the sound absorption capability of the motor-vehicle underbody liner as a whole. For controlled diminution of rolling noise, the carrier component and the additional absorber component are together adjusted to a sound absorption behavior having a sound absorption maximum in a frequency range from 800 Hz to 1250 Hz.

In an open-cell porous material, its capability for sound absorption, in particular with regard to the frequency spectrum absorbed by the material, correlates with the gas permeability of the respective material, i.e. with the flow resistance that the respective material presents to a gas flowing through it. As the flow resistance of the open-cell porous material of the carrier component changes, its sound absorption behavior, in particular the frequency spectrum absorbed by the material, also changes. The same applies to open-cell porous material that at least contributes to the constitution of the additional absorber component.

The flow resistance of a porous open-cell material can be modified by mechanical compacting of the material, leaving a residual porosity. Additionally or alternatively, the flow resistance of a porous open-cell material can be adjusted by sequential layering of plies having different flow resistance values. The open-cell porous material of the carrier component, and optionally also of the additional absorber component, can therefore be a material compacted down to a residual porosity and/or a layered body constituted from several open-cell porous plies, at least two plies of the layered body having different flow resistance values.

By means of a few experiments, one skilled in the art can empirically ascertain the flow resistance required by a material or a material composition in order to absorb particularly strongly in a desired frequency range.

If the additional absorber component is embodied entirely or in portions as a chamber absorber, its sound absorption behavior is adjustable by corresponding dimensioning of the chambers.

The motor-vehicle underbody liner according to the present invention thus comprises two separate sound-absorbing components, namely the carrier component and the additional absorber component, which together have a sound absorption maximum in the frequency range from 800 Hz to 1250 Hz which is particularly relevant for rolling noise when driving in town, i.e. at speeds of between 40 and 60 km/h.

The rolling noise in accordance with UN/ECO regulation ECE R51.03 is authoritative with regard to the sound absorption aimed at in accordance with the present Application. This regulation refers to a sound emission test as a motor vehicle drives past an observer outside the vehicle. The rolling noise of tires contributes significantly to the drive-by noise perceived by the observer located outside the motor vehicle as the motor vehicle drives by. In most road traffic ordinances, exclusively profiled tires are permitted for motor vehicles in road traffic. Because, as a profiled tire rolls on a substrate, tire lugs spaced apart from one another in a circumferential direction come into abutting engagement with the substrate as a function of the rolling speed, the frequency of the rolling noise depends on the rolling speed and thus on the driving speed of the motor vehicle. The vehicle speeds indicated in the aforesaid regulation ECE R51.03 are therefore authoritative in terms of the present assessment of the sound absorption of a rolling noise of vehicle tires.

Preferably both the carrier component and the additional absorber component, each considered individually, have a sound absorption maximum outside the range from 800 Hz to 1250 Hz. The absorption in the target frequency range from 800 Hz to 1250 Hz achieved by the motor-vehicle underbody liner as a whole, i.e. the carrier component and additional absorber component together, is then particularly effective.

If the sound absorption graph of the motor-vehicle underbody liner is intended to exhibit several local sound absorption maxima, it is sufficient if one local sound absorption maximum is located in the frequency range from 800 Hz to 1250 Hz. Because of the more-efficient absorption, however, it is preferred that an absolute sound absorption maximum of the motor-vehicle underbody liner be located in the aforesaid frequency range.

As has already been explained above, the sound absorption behavior of the additional absorber component can also be adjusted in targeted fashion, but the manner in which the sound absorption maximum is adjusted depends on the configuration of the additional absorber component and thus on the physical sound absorption principle being applied.

Thanks to the arrangement of the additional absorber component on the installation side of the carrier component, the carrier component constitutes an outer side of the motor-vehicle underbody liner, or at least the carrier component covers the additional absorber component externally toward the vehicle surroundings. The carrier component thus protects the additional absorber component from stone impact, other mechanical stresses, moisture, etc.

In principle, the sound absorption maxima of the carrier component on the one hand and of the additional absorber component on the other hand can lie at identical frequencies, so that the sound portions that the carrier component allows to pass through to the additional absorber component are absorbed there. This can be advantageous when a requirement exists for cancelling out sound as completely as possible in a very narrow frequency range around the sound absorption maximum. As a rule, the sound of a rolling noise constitutes a kind of murmur made up of different frequencies of sound, so that for maximally broad-band sound absorption of the rolling noise it can be advantageous if the sound absorption maxima of the carrier component and of the additional absorber component lie at different frequencies. Each component can thus absorb a different frequency range and extract optimum energy from the sound waves, so that in total, a cancellation in the aforementioned frequency range occurs.

The rolling noise of the tires while driving has a portion that is emitted directly toward the external observer. This cannot be influenced by the motor-vehicle underbody according to the present invention. Further portions of the rolling noise are emitted toward the underbody and reflected from there, or reflected from the roadway toward the underbody. Sound is in some cases reflected several times between the roadway and underbody before it reaches the observer located outside the vehicle as it travels. This reflected sound can be absorbed by the motor-vehicle underbody liner, and the acoustic emissions of the vehicle can thereby be reduced.

The carrier component is preferably inherently rigid.

The carrier component can comprise, for constitution thereof, a preferably inherently rigid thermoplastically bonded fiber web, for example an LWRT material. LWRT materials are well known in the automotive engineering sector. The fiber web is preferably constituted from glass fibers, although other fibers are also possible, for example mineral fibers, natural fibers, or plastic fibers. What is critical is that the material of the fiber web be stable in terms of shape and conformation at a temperature at which the thermoplastic binder has already softened or melted. The carrier component can also be manufactured entirely from such a material.

Alternatively or additionally, the carrier component can comprise, for constitution thereof, an open-cell foam material, for example a hard foam in order to furnish inherent rigidity. It can also be manufactured entirely from such a material.

"Inherently rigid" means, for purposes of the present Application, that the shape of the component changes only insignificantly or not at all in response to its own dead weight and to moments resulting therefrom. In principle, the foam material used for or contributing to the constitution of the carrier component can also be an originally closed-cell foam whose foam cells have been opened by tool engagement, for example by needling.

The aforementioned thermoplastically bonded fiber web is preferred over an inherently rigid foam material because of its greater strength and rigidity for the same weight. The fibers of the thermoplastically bonded fiber web have a length of preferably between 3 and 8 cm, particularly preferably approximately 5 cm, and are located relative to one another with only a randomly aligned orientation in the material. The thermoplastically bonded fiber web can be covered on its liner side and/or installation side with a further nonwoven fabric constituting a cover nonwoven fabric, so that the nonwoven fabric protects the LWRT ply below it from mechanical external influences. The nonwoven fabric itself can also be thermoplastically bonded, preferably using a thermoplastic binder that is compatible with or preferably identical to that of the LWRT ply below it. The carrier component, or at least one or several externally located plies thereof, can be hygrophobically and/or oleophobically impregnated in order to prevent penetration of water and/or oily substances from the vehicle surroundings to the actual vehicle underbody.

The aforementioned cover nonwoven fabric not only can serve the aforementioned mechanical protective function but can also serve to adjust the flow resistance at least of the carrier component. An exact knowledge of the value of the flow resistance that is set is immaterial in this context. All that is critical is that the motor-vehicle underbody as a whole exhibit an absorption maximum in the aforesaid frequency range from 800 Hz to 1250 Hz.

For weight reasons and in the interest of even better sound absorption, according to a preferred refinement of the present invention the additional absorber component also encompasses or is manufactured from a porous material. If the additional absorber component is embodied as a chamber absorber, however, the additional absorber component can also be constituted by a solid material having no porosity. Particularly preferably, however, the additional absorber component constituting a chamber absorber can be constituted from a porous material or with involvement of a porous material. The use of a closed-cell foam material is conceivable here, and is in fact preferred in order to save weight.

The statements made above about the carrier component with regard to possible porous materials apply correspondingly to the additional absorber component, so that the additional absorber component can encompass or be manufactured from a fiber web and/or a foam material. Divergently from what was stated above regarding the carrier component, however, the fiber web contributing to the constitution of the additional absorber component can be present in unbonded or only partly bonded fashion, i.e. for example having locally bonded regions and other locally unbonded regions. The bonded and/or unbonded regions have a dimension that is greater than an average fiber length of the fiber material of the additional absorber component. It is also possible to use, for the constitution of the additional absorber component, fibers having different dimensions from those for constitution of the carrier component. The fibers of the additional absorber component can differ from the fibers of the carrier component in terms of rigidity, in particular flexural rigidity, tensile strength, length and/or width and/or thickness dimensions, material, and the like. As already stated above, foam material can also be used in closed-cell fashion to constitute a chamber absorber. Open-cell porous materials can likewise be used.

The terms "material" and "raw material" are used synonymously in the present Application.

The additional absorber component can obtain greater component strength from the fact that it encompasses or is manufactured from an at least locally bonded fiber web.

As has already been indicated above, the additional absorber component can encompass or be a chamber absorber. Particularly advantageously, the additional absorber component can exhibit at least or exactly two sound absorption maxima if it is constituted, as a chamber absorber, from a porous, inherently rigid, open-cell material. A first sound absorption maximum can then be defined by the shape and dimensions of the respective chambers. A second sound absorption maximum can be defined by the porosity or degree of densification of the open-cell material of the additional absorber component. The additional absorber component, constituting an inherently rigid component, can be constituted for that purpose from a thermoplastically bonded fiber web and/or from an open-cell foam material, for example a hard foam, in particular from polyurethane foam. The statements made above regarding the open-cell materials apply correspondingly. If the additional absorber component exhibits two sound absorption maxima, at least one then lies outside the range from 800 Hz to 1250 Hz; preferably, both lie outside that range.

The additional absorber component can encompass a porous material that is surrounded by a solid plastic film or metal foil. The film or foil surrounding the additional absorber component, preferably a plastic film such as a PET film for weight reasons, acts as a membrane.

Divergently from the complete encasing of porous material of the additional absorber component, a sub-component, constituted from porous material, of the additional absorber component can be covered on only one side with a gas-flow-tight, i.e. gas-impermeable, film. Because rolling-noise sound emitted from the tire contact patch or the roadway must first pass through the carrier material from the liner side to the installation side in order to arrive at the additional absorber component, and because solid gas-tight films can have a sound-reflective effect, for the case of a gas-flow-impermeable film arranged on one side of the additional absorber component, the film is arranged on that side of the additional absorber component which faces away from the carrier component and consequently faces toward the underbody.

The gas-flow-impermeable film can be connected only locally, i.e. at predetermined connecting points, to the remainder of the additional absorber component, i.e. for example to the sub-component manufactured from porous material, while between the connection points, portions of the film and of the sub-component are located in unconnected fashion opposite one another. In these unconnected portions, whose dimension can be greater than the average pore size of the porous material connected to the film, the film can move relative to the sub-component and act as a membrane.

For safety reasons, the additional absorber component is usually fixedly connected to the carrier component, for example at the mutually contacting surface portions on the installation side of the carrier component.

Part of the motor-vehicle underbody liner can also be an air gap that can be provided, when the motor-vehicle underbody liner is in the completely installed state, between the underbody of the vehicle and that outer surface of the additional absorber component which faces toward it. In order to allow such an air gap to be provided between the underbody and the additional absorber component, the carrier component can project beyond the additional absorber component on the installation side. The carrier component can comprise, on the installation side, contact surfaces that are embodied for direct contact with the vehicle underbody. In the case of the particular embodiment of the motor-vehicle underbody liner which is described in the present case, at least some of the contact surfaces are located at a distance from that outer side of the additional absorber component which faces away from the installation side.

According to an intensified refinement of the present invention, the porous material of the carrier component can be densified locally to different degrees. For example, it can have a different densification, i.e. a different porosity, in zones in which sound waves proceeding from the rolling tires arrive to a greater extent, for example because of the above-described reflection or multiple reflection, than in other regions.

The term "porosity" refers to the proportion of gas volume in terms of the total volume of a material body. A porous material body half of whose volume is made up of gas consequently has a porosity of 50%.

What applies to porous material of the carrier component also applies to porous material of the additional absorber component. It too can be densified locally to different degrees.

The present invention further relates to a motor vehicle having an underbody, in particular having a bottom panel that constitutes or is encompassed by the underbody, and having a motor-vehicle underbody liner as described and refined above which is connected to the underbody. For particular mechanical protection of the additional absorber component, the underbody and the carrier component form a chamber, enclosed on all sides, in which the additional absorber component is received as an encapsulated component.

As has been stated above, an air gap can be provided between the motor-vehicle underbody and that outer side of the additional absorber component which faces toward it. Preferably, no material either of the additional absorber component or of the carrier component extends in that air gap.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWINGS

The invention may take physical form in certain parts and arrangement of parts, a preferred embodiment of which will be described in detail and illustrated in the accompanying drawing which forms a part hereof and wherein:

FIG. 1 is a schematic side view of a motor vehicle having a motor-vehicle underbody liner of the present invention.

DESCRIPTION OF PREFERRED EMBODIMENTS

Referring now to the drawing wherein the showings are for the purpose of illustrating preferred and alternative embodiments of the invention only and not for the purpose of limiting the same, in FIG. 1, a motor vehicle according to the present invention having a motor-vehicle underbody liner according to the present invention is labeled in general with the number 10. Vehicle 10 comprises front wheels 12 and rear wheels 14 which respectively stand on a substrate U.

Vehicle 10 and its components are not depicted to scale; in particular, thickness dimensions and size relationships are not depicted to scale.

Vehicle 10 comprises an underbody 16 that is connected in a manner known per se to body 17 (not of further interest here) of vehicle 10. Underbody 16 is depicted as a flat plate. Divergently therefrom, underbody 16 can and will in reality comprise stiffening configurations such as ridges and ribs. Underbody 16 can furthermore comprise regions that are curved, in particular toward the edge of the vehicle. Underbody 16 can be produced from sheet metal or from a dimensionally stable planar plastic part.

Underbody 16 is lined with an underbody liner 18 on its side facing toward vehicle external surroundings E or toward substrate U. Underbody liner 18 can be clipped and/or riveted and/or adhesively bonded and/or bolted to underbody 16 for that purpose. In the example depicted, underbody liner 18 comprises mounting configurations 20 that facilitate the connection of underbody liner 18 to underbody 16. Such mounting configurations can be, for example, passthrough holes having a reinforced rim, to name only one possible example. Threaded shanks can likewise protrude, as mounting configurations, from underbody liner 18 toward underbody 16. The threaded shanks can be part of a threaded component, for example a bolt, whose head part can be recessed into and/or anchored in the material of underbody liner 18, in particular of a carrier component 22. When underbody liner 18 is in the completely installed state, contact surfaces 21 of carrier component 22 are in directly abutting engagement with underbody 16.

The preferably inherently rigid carrier component 22 is a carrier component made of an LWRT material, i.e. a thermoplastically bonded fiber web, preferably made of a polyolefinically bonded glass-fiber web. Carrier component 22 is a planar carrier component, since it has a substantially larger dimension in its extent parallel to underbody 16 than in its thickness direction proceeding parallel to the drawing plane of FIG. 1. Carrier component 22 was compacted from a lofted state in the context of its manufacture, but is still porous and thus contains a gas volume or a gas portion as a function of its porosity. Because of its material nature as a thermoplastically bonded fiber web, the LWRT material of carrier component 22 is open-cell, i.e. gas can flow through it in a thickness direction. The LWRT material can be multiple-ply, the weight proportion of thermoplastic binder material of a core layer of the LWRT material located farther inward being less than in a cover layer of the LWRT material located farther outward.

The degree of compaction or densification of the LWRT material upon constitution of carrier component 22 is preferably selected so that the resulting carrier component 22 exhibits a sound absorption maximum in a frequency range outside 800 Hz to 1250 Hz. This frequency range is the frequency range of a rolling noise that occurs when front wheels 12 and rear wheels 14 roll on substrate U at a predefined speed of approximately 45 to 50 km/h. It is intended to be absorbed by motor-vehicle underbody liner 18 as a whole.

LWRT carrier component 22 can be densified locally to different degrees in order to most strongly absorb different frequencies locally. For the sound absorption maximum recited as claimed, however, underbody liner 18 as a whole is always to be measured.

In the present case, mounting configurations 20 for mounting underbody liner 18 on underbody 16 are embodied only in carrier component 22.

An additional absorber component 24 is arranged between carrier component 22 and underbody 16. Additional absorber component 24 encompasses several (in the example depicted, three) additional absorber sub-components 24a, 24b, and 24c embodied separately from one another. They are each located on installation side 22a of the carrier component, facing toward underbody 16. Installation side 22a of carrier component 22 is located oppositely from its liner side 22b.

Sub-components 24a, 24b, and 24c of additional absorber component 24 are embodied differently in order to illustrate different possibilities for configuring an additional absorber component 24. Sub-component 24a is embodied as a chamber absorber, and comprises chambers 26 configured as a function of the frequency range that is to be absorbed.

Sub-component 24b is embodied as a mass, surrounded by a film 30, of a porous core 32. Porous core 32 can in turn comprise foam material and/or fiber material. The fiber material can be bonded with thermoplastic or thermosetting plastic, but can also be present in unbonded fashion in the casing of film 30. Sub-component 24b completely fills up the clearance between underbody 16 and installation side 22a of carrier component 22, i.e. it abuts against installation side 22a of carrier component 22 and is fixedly connected thereto, and abuts in contact with underbody 16. It is not fixedly connected to underbody 16, however, but is movable relative thereto.

Sub-component 24c is embodied in portions as a chamber absorber having absorbent chambers 26, and in portions as a porous component. On its side facing away from installation side 22a, sub-component 24c comprises a gas-flow-impermeable film 34 that reflects sound coming from substrate U after passing through carrier component 22 and through that part of sub-component 24c which is located below film 34 in FIG. 1, and forces it to pass again through the aforesaid portions of underbody liner 18. Sound is absorbed in underbody liner 18 each time it passes through underbody liner 18.

An air gap 36, in which only air is present, is configured between film 34 and underbody 16. Carrier component 22 therefore projects beyond sub-component 24c on installation side 22a in the region of sub-component 24c.

Carrier component 22 is preferably connected sealedy on all sides to underbody 16, abuttingly therewith.

Additional absorber sub-component 24a is likewise constituted from porous LWRT material and can therefore, via sound absorption in resonator chambers 26 that are configured, also absorb sound in the pores of the LWRT material that constitutes additional absorber component 24. The same can be true of sub-component 24c.

Sub-components 24a, 24b, and 24c are respectively received in sub-capsules 28a, 28b, and 28c that together constitute LWRT carrier component 22 along with underbody 16. Sub-capsules 28a, 28b, and 28c together constitute a capsule 28. As a result, additional absorber component 24 is completely shielded by underbody 16 and carrier component 22 with respect to vehicle surroundings E.

In the example depicted, sub-components 24a, 24b, and 24c are spatially and physically completely separated from one another. Divergently therefrom, additional absorber component 24 can comprise more or fewer sub-components than the three shown. In addition, one or several sub-components can be embodied physically interconnectedly, for example by means of connecting flanges that are small compared with the remaining volume of the relevant sub-components.

Preferably the individual sub-components 24a, 24b, and 24c also have noise absorption behaviors having respective sound absorption maxima in a range outside 800 Hz to 1250 Hz. The entire underbody liner 18, however, in combination with the constituents described, exhibits a sound absorption behavior having a sound absorption maximum in the range from 800 Hz to 1250 Hz which is relevant for absorption of the rolling noise of tires.

Based on present knowledge, carrier component 22 preferably has a thickness of between 4 and 8 mm, preferably between 4 and 6 mm. In the individual sub-capsules 28a, 28b, and 28c, the clearance between installation side 22a, recessed from underbody 16, of the respective portion of carrier component 22 and underbody 16 is 35 to 60 mm, preferably 40 to 50 mm. As shown in FIG. 1, this clearance can be completely filled up by additional absorber component 24, or an air gap 36 can be left between the underbody and additional absorber component 24.

Carrier component 22 can be connected to underbody 16 directly, or indirectly with interposition of a connecting part connected both to carrier component 22 and to underbody 16.

Divergently from what was stated above, additional absorber component 24 can be constituted entirely or partly by a solid, non-porous material rather than LWRT material. This applies principally to sub-components 24a and 24c that are embodied at least in portions as chamber absorbers. A sound absorption maximum resulting from the porous material itself is then absent.

Additional absorber component 24 and/or carrier component 22 can furthermore be constituted by a porous material other than LWRT, for example an open-cell foam, preferably a hard foam because of the desired inherent rigidity. Also categorized as an open-cell foam is an originally closed-cell foam that has been reprocessed into an open-cell foam by penetration with an appropriate tool, for example needles. Additional absorber component 24 can also be constituted entirely or partly by closed-cell foam.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A motor vehicle having a motor-vehicle underbody and having a motor-vehicle underbody liner, the motor-vehicle underbody liner encompassing a planar porous open-cell carrier component; the carrier component being embodied for mounting onto the motor-vehicle underbody and for being carried along therewith; the carrier component comprising an installation side that faces toward the motor-vehicle underbody during operation as intended, and a liner side that faces away from the motor-vehicle underbody during operation as intended; an additional absorber component having a sound absorption behavior being arranged on the installation side of the carrier component; the carrier component and the additional absorber component being adjusted to a collective sound absorption behavior having a sound absorption maximum in a frequency range from 800 Hz to 1250 Hz, the motor-vehicle underbody liner is connected to the motor-vehicle underbody; the motor-vehicle underbody and the carrier component constituting a capsule closed on all sides in which the additional absorber component is received as an encapsulated component.

2. The motor vehicle according to claim 1, wherein a sound absorption maxima of the carrier component and of the additional absorber component are different.

3. The motor vehicle according to claim 1, wherein the carrier component projects beyond the additional absorber component on the installation side.

4. The motor vehicle according to claim 1, wherein the carrier component includes at least one of an inherently rigid thermoplastically bonded fiber web and an open-cell foam material.

5. The motor vehicle according to claim 1, wherein the carrier component is formed from at least one of an inherently rigid thermoplastically bonded fiber web and an open-cell foam material.

6. The motor vehicle according to claim 1, wherein the additional absorber component includes a porous material.

7. The motor vehicle according to claim 1, wherein the additional absorber component is formed from a porous material.

8. The motor vehicle according to claim 1, wherein the additional absorber component includes and/or is formed from at least one of a fiber web and a foam material.

9. The motor vehicle according to claim 8, wherein the additional absorber component includes a fiber web bonded at least in portions.

10. The motor vehicle according to claim 8, wherein the additional absorber component is formed from a fiber web bonded at least in portions.

11. The motor vehicle according to claim 1, wherein the additional absorber component encompasses a chamber absorber.

12. The motor vehicle according to claim 1, wherein the additional absorber component comprises a gas-flow-impermeable film on its side facing away from the installation side of the carrier component.

13. The motor vehicle according to claim 1, wherein the porous material of the carrier component is densified locally to different degrees.

14. The motor vehicle according to claim 6, wherein the porous material of the additional absorber component is densified locally to different degrees.

15. The motor vehicle according to claim 1, wherein the motor-vehicle underbody encompasses a bottom panel.

16. The motor vehicle according to claim 1, wherein an air gap is present between the underbody and the additional absorber component.

17. The motor vehicle according to claim 15, wherein the bottom panel constitutes the motor-vehicle underbody.

\* \* \* \* \*